United States Patent
Hiramatsu

(10) Patent No.: US 11,757,312 B2
(45) Date of Patent: Sep. 12, 2023

(54) POWER RECEIVING APPARATUS, POWER TRANSMITTING APPARATUS, CONTROL METHODS THEREOF, AND NON-TRANSITORY COMPUTER-READABLE STORAGE MEDIUM

(71) Applicant: CANON KABUSHIKI KAISHA, Tokyo (JP)

(72) Inventor: Tomoki Hiramatsu, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 331 days.

(21) Appl. No.: 17/116,607

(22) Filed: Dec. 9, 2020

(65) Prior Publication Data
US 2021/0184512 A1    Jun. 17, 2021

(30) Foreign Application Priority Data
Dec. 12, 2019 (JP) .................... 2019-224822

(51) Int. Cl.
H02J 50/80 (2016.01)
H02J 50/10 (2016.01)
H02J 7/00 (2006.01)

(52) U.S. Cl.
CPC .......... *H02J 50/80* (2016.02); *H02J 7/00045* (2020.01); *H02J 50/10* (2016.02)

(58) Field of Classification Search
CPC ......... H02J 50/80; H02J 7/00045; H02J 50/10
See application file for complete search history.

(56) References Cited

U.S. PATENT DOCUMENTS

| | | | |
|---|---|---|---|
| 9,001,352 B2* | 4/2015 | Hirano | H04N 1/32797 358/1.14 |
| 9,424,665 B1* | 8/2016 | Frazier | H04K 1/06 |
| 9,432,846 B2* | 8/2016 | Hirano | G06F 1/3296 |
| 9,648,190 B2* | 5/2017 | Hirano | H04N 1/4426 |
| 10,396,602 B2* | 8/2019 | Zeine | H02J 50/23 |

(Continued)

FOREIGN PATENT DOCUMENTS

| | | |
|---|---|---|
| JP | 2010104097 A | 5/2010 |
| JP | 2012217224 A | 11/2012 |
| JP | 2016007116 A | 1/2016 |

*Primary Examiner* — Jared Fureman
*Assistant Examiner* — Michael J Warmflash
(74) *Attorney, Agent, or Firm* — Canon U.S.A., Inc. IP Division

(57) ABSTRACT

A power receiving apparatus for receiving power transmitted by wireless power transmission from a power transmitting apparatus, comprises a first communication unit for communicating with the power transmitting apparatus, and a second communication unit for performing communication at a speed higher than the first communication unit. The power receiving apparatus determines, by communication via the first communication unit, whether the power transmitting apparatus has a function of transmitting/receiving, via the second communication unit, information for device authentication with the power transmitting apparatus, and enables the second communication unit to execute transmission/reception of the information for the device authentication with the power transmitting apparatus via the second communication unit if it is determined that the power transmitting apparatus has the function and the second communication unit is in a disabled state.

17 Claims, 12 Drawing Sheets

(56) References Cited

U.S. PATENT DOCUMENTS

| | | | |
|---|---|---|---|
| 11,101,915 B2* | 8/2021 | Anlage | H04K 1/06 |
| 2013/0229673 A1* | 9/2013 | Nakayama | H04N 1/00127 |
| | | | 358/1.13 |
| 2014/0240747 A1* | 8/2014 | Hirano | G06F 1/3296 |
| | | | 358/1.14 |
| 2015/0172924 A1* | 6/2015 | Hirano | H04W 12/06 |
| | | | 726/4 |
| 2015/0340878 A1* | 11/2015 | Oosumi | H02J 7/00034 |
| | | | 307/104 |
| 2016/0344886 A1* | 11/2016 | Hirano | H04N 1/4426 |
| 2020/0036212 A1* | 1/2020 | Choi | H02J 50/12 |
| 2020/0113006 A1* | 4/2020 | Bloechl | G01S 5/14 |
| 2021/0296944 A1* | 9/2021 | Shichino | H02J 7/00034 |
| 2022/0181918 A1* | 6/2022 | Hiramatsu | H02J 50/80 |

* cited by examiner

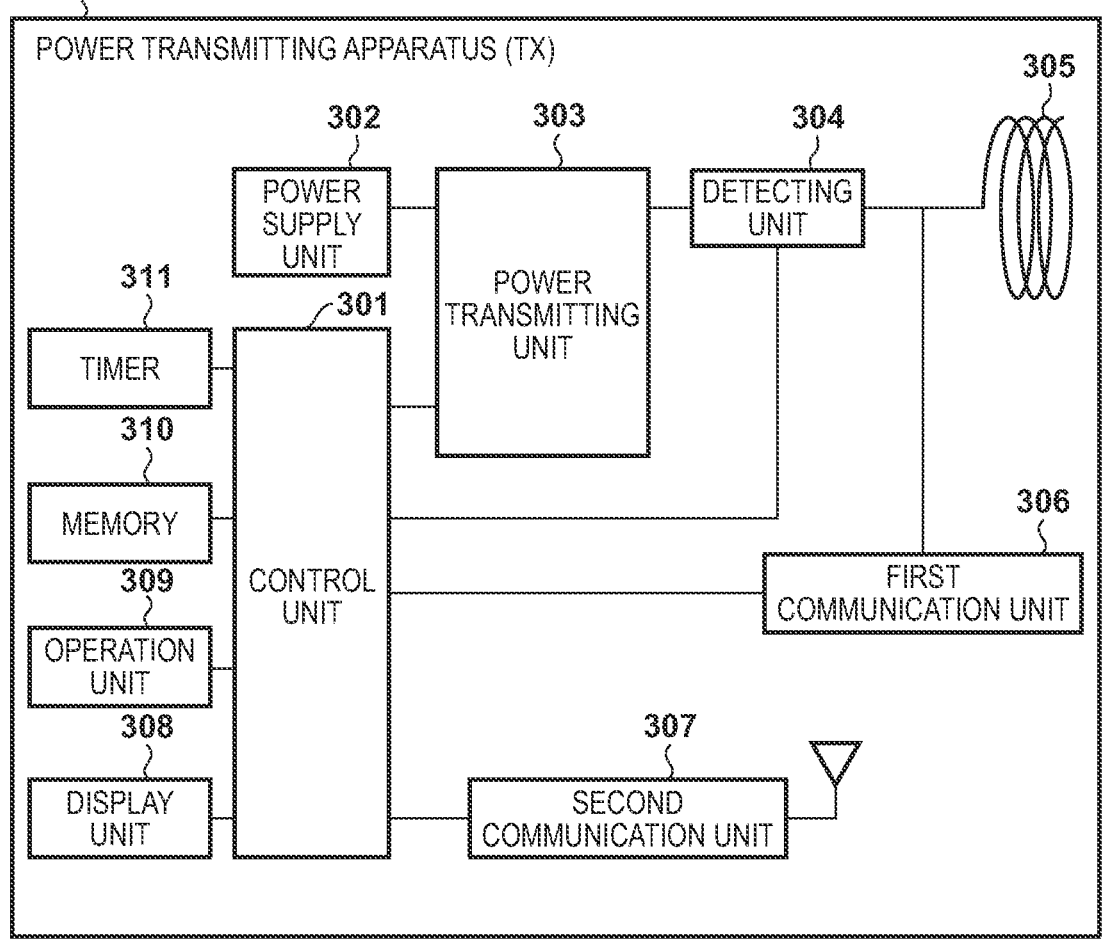

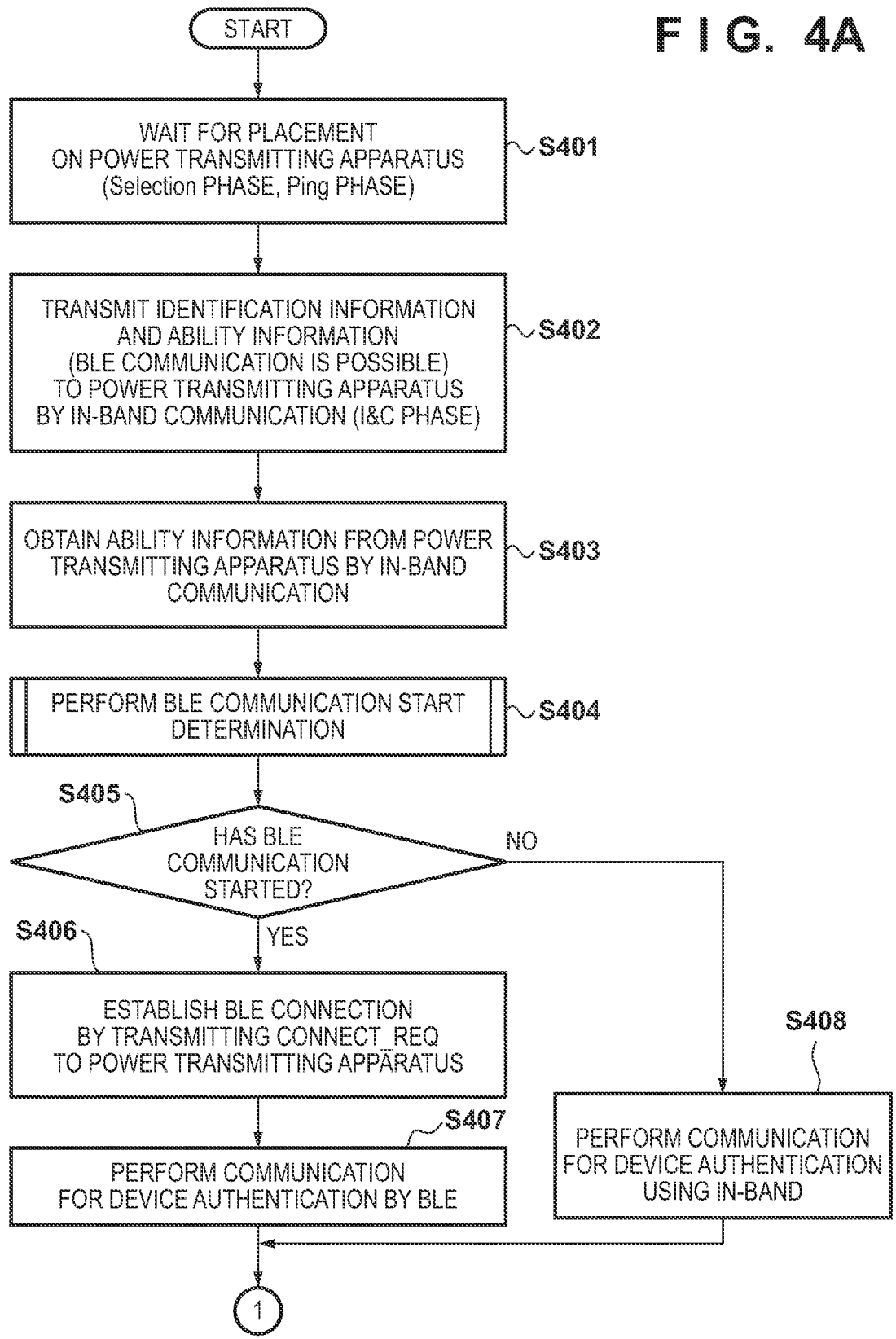

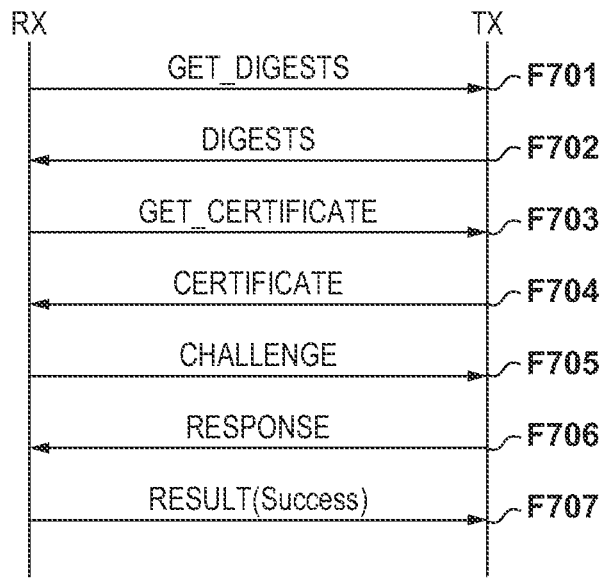
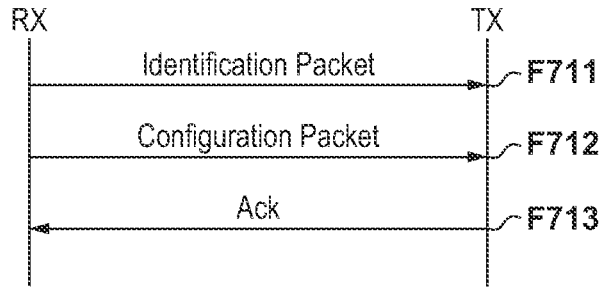
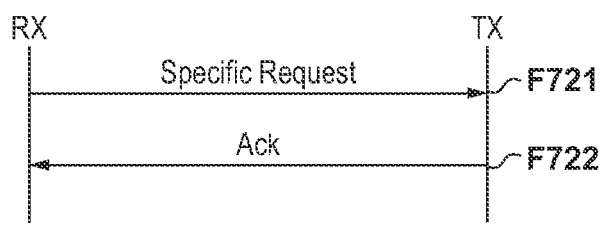

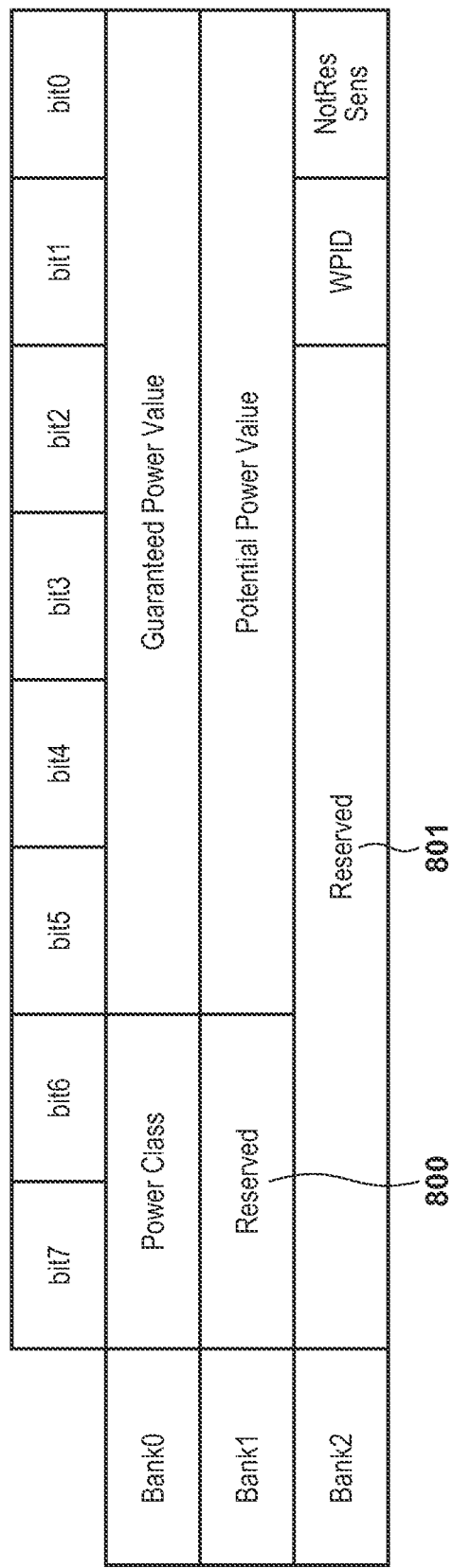

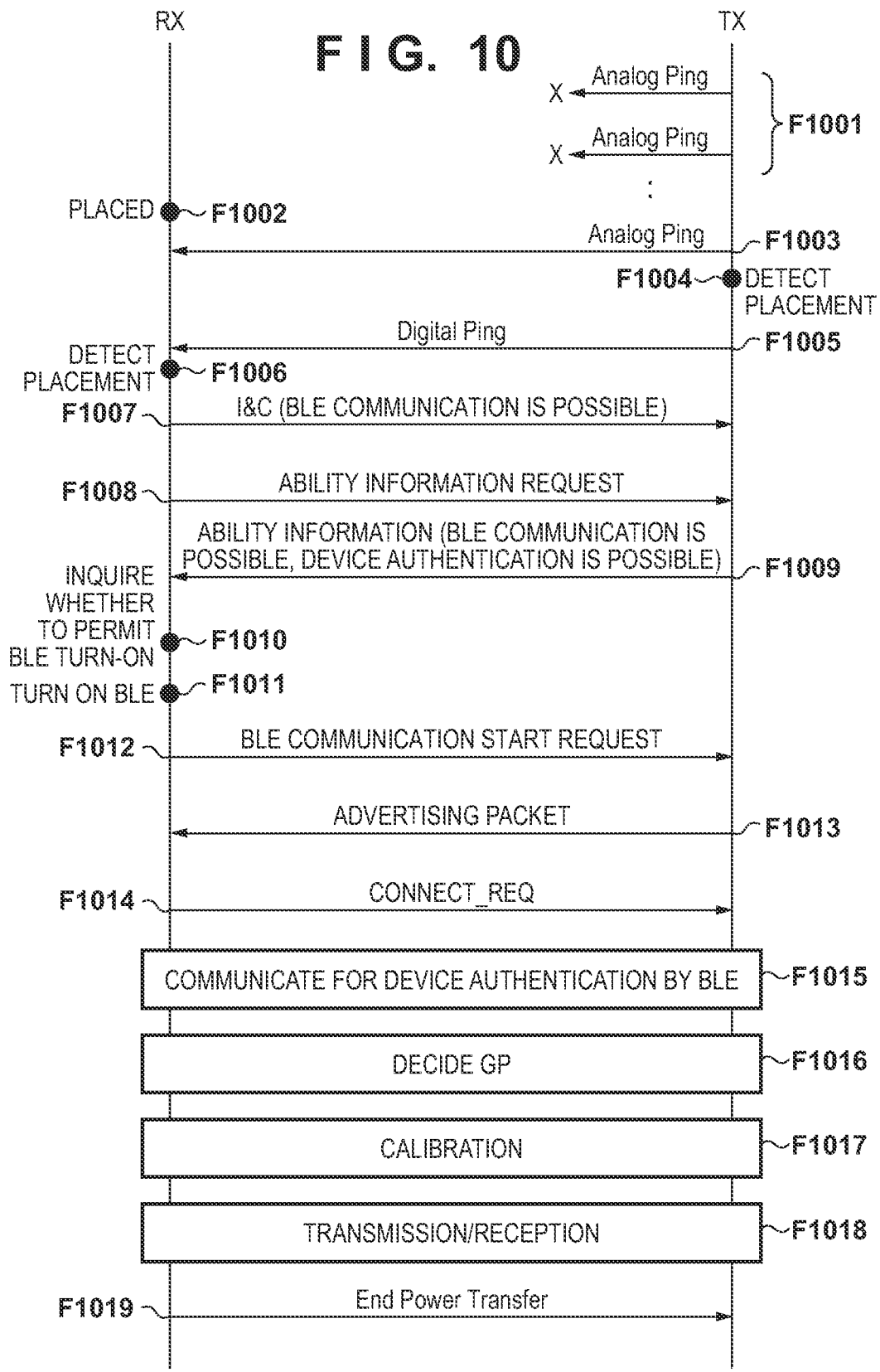

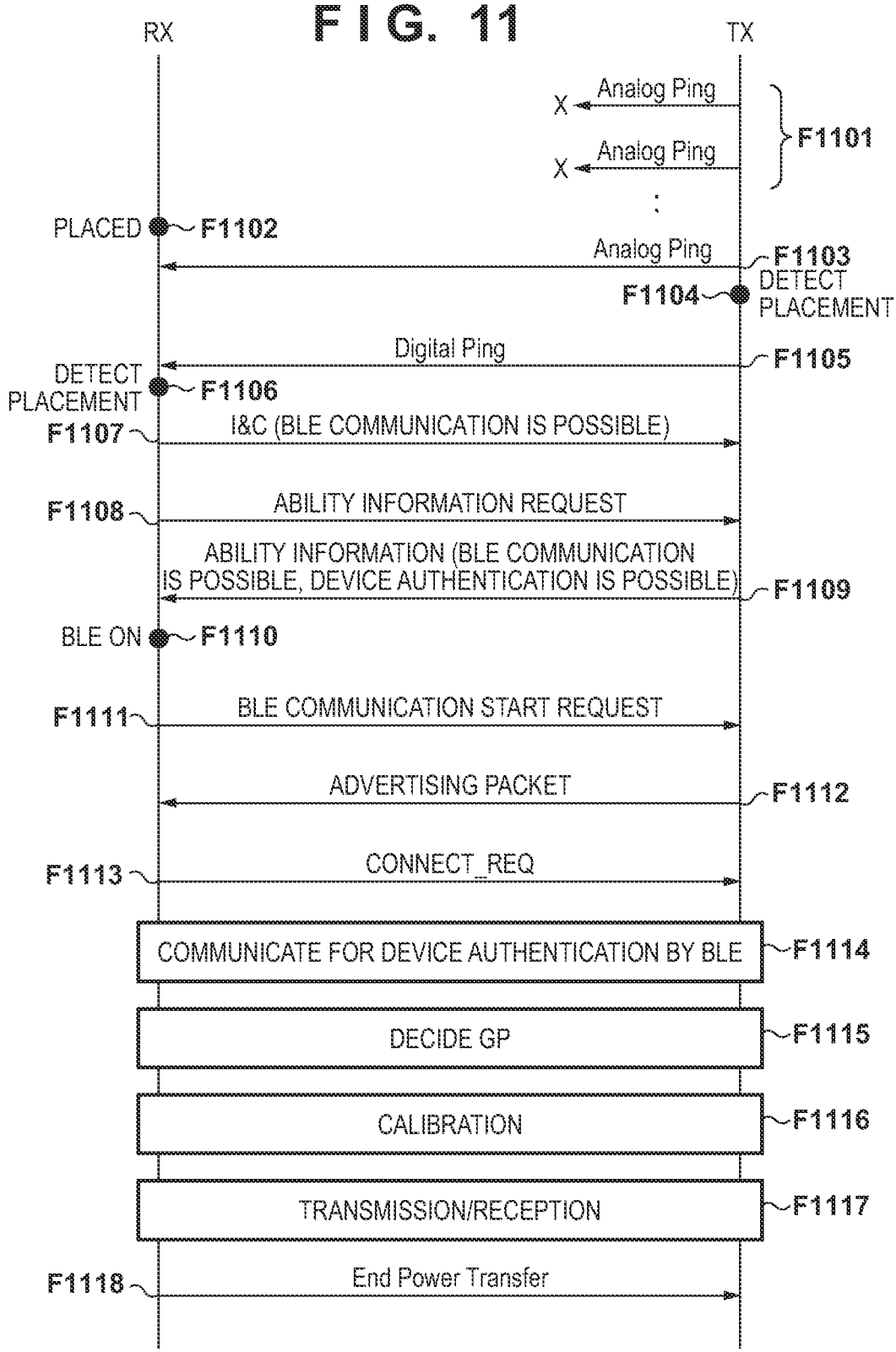

POWER RECEIVING APPARATUS, POWER TRANSMITTING APPARATUS, CONTROL METHODS THEREOF, AND NON-TRANSITORY COMPUTER-READABLE STORAGE MEDIUM

BACKGROUND

Field

The present disclosure relates to a power receiving apparatus and a power transmitting apparatus for wireless power transmission, control methods thereof, and a non-transitory computer-readable storage medium.

Description of the Related Art

Technology development of wireless power transmission systems has widely been conducted. Japanese Patent Laid-Open No. 2016-007116 discloses a power transmitting apparatus and a power receiving apparatus complying with a standard (WPC standard) defined by the Wireless Power Consortium (WPC) that is a standards organization for wireless charging standards. The power transmitting apparatus and the power receiving apparatus of Japanese Patent Laid-Open No. 2016-007116 exchange control information necessary for control of power transmission by so-called in-band communication superimposed on power to be transmitted/received. In addition, Japanese Patent Laid-Open No. 2010-104097 discloses a device authentication method between a power transmitting apparatus and a power receiving apparatus, which perform wireless charging. According to Japanese Patent Laid-Open No. 2010-104097, the power transmitting apparatus transmits challenge data to the power receiving apparatus via a power transmitting coil, and the power receiving apparatus transmits response data created by performing an authentication operation for the challenge data to the power transmitting apparatus via a power receiving coil. The power transmitting apparatus collates the response data received from the power receiving apparatus, thereby executing a device authentication protocol. Also, Japanese Patent Laid-Open No. 2012-217224 proposes a technique of exchanging control signals to be transmitted/received between a power transmitting apparatus and a power receiving apparatus by communication (so-called out-of-band communication) via a frequency and coils (or antennas) different from those in wireless power transmission.

Communication for device authentication uses a large quantity of data and is therefore preferably executed by out-of-band communication capable of performing communication at a speed higher than in-band communication. However, even if the power receiving apparatus has an out-of-band communication function, the out-of-band communication function of the power receiving apparatus may be in a disabled state when a user places the power receiving apparatus on the power transmitting apparatus. In this case, since device authentication using in-band communication is performed, time is needed until the end of device authentication.

SUMMARY

The present disclosure provides a technique of reducing the time of device authentication by using appropriate communication.

According to one aspect of the present disclosure, there is provided a power receiving apparatus for receiving power transmitted by wireless power transmission from a power transmitting apparatus, comprising: a first communication unit configured to communicate with the power transmitting apparatus; a second communication unit configured to perform communication at a speed higher than the first communication unit; a determination unit configured to determine, by communication via the first communication unit, whether the power transmitting apparatus has a function of transmitting-receiving, via the second communication unit, information for device authentication with the power transmitting apparatus; and an execution unit configured to enable the second communication unit and execute transmission/reception of the information for the device authentication with the power transmitting apparatus via the second communication unit if it is determined by the determination unit that the power transmitting apparatus has the function, and the second communication unit is in a disabled state.

According to another aspect of the present disclosure, there is provided a power transmitting apparatus for performing wireless power transmission to a power receiving apparatus, comprising: a first communication unit configured to communicate with the power receiving apparatus; a second communication unit configured to perform communication at a speed higher than the first communication unit; a notification unit configured to start communication with the power receiving apparatus using the first communication unit upon detecting that the power receiving apparatus exists in a power-transmittable range of the wireless power transmission and notify the power receiving apparatus, via the first communication unit, that transmission/reception of information for device authentication with the power receiving apparatus using the second communication unit is possible; and an execution unit configured to establish communication using the second communication unit with the power receiving apparatus in accordance with a request from the power receiving apparatus and execute the transmission/reception of the information for device authentication with the power receiving apparatus via the second communication unit.

Further features of the present disclosure will become apparent from the following description of exemplary embodiments with reference to the attached drawings.

BRIEF DESCRIPTION OF THE DRAWINGS

FIG. 3 is a block diagram showing an example of the arrangement of a power transmitting apparatus according to the embodiment:

FIGS. 4A and 4B are flowcharts showing an example of the procedure of processing of the power receiving apparatus;

FIG. 7A is a view showing a communication sequence for device authentication;

FIG. 7B is a view showing a communication sequence of an I & C phase;

FIG. 7C is a view showing a communication sequence of a negotiation phase;

FIG. 8 is a view showing an example of the structure of a power transmitter capability packet;

FIG. 10 is a view showing the first processing example executed by the wireless power transmission system according to the embodiment;

FIG. 11 is a view showing the second processing example executed by the wireless power transmission system according to the embodiment.

DESCRIPTION OF THE EMBODIMENTS

Figure 1:
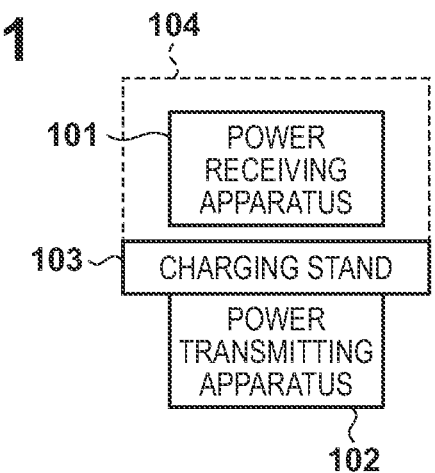
FIG. 1 is a view showing the arrangement of a wireless power transmission system according to the embodiment.

Hereinafter, embodiments will be described in detail with reference to the attached drawings. Note, the following embodiments are not intended to limit the scope of the disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

(1) Arrangement of System

FIG. 1 shows an example of the arrangement of a wireless power transmission system according to this embodiment. In an example, the wireless power transmission system according to this embodiment is configured to include a power receiving apparatus 101 and a power transmitting apparatus 102, and constitutes a wireless charging system in which the power receiving apparatus 101 performs charging by power supplied from the power transmitting apparatus 102 to the power receiving apparatus 101 by wireless power transmission. The power receiving apparatus 101 is an electronic device that receives power from the power transmitting apparatus 102 and charges an internal battery. The power transmitting apparatus 102 is an electronic device that wirelessly transmits power to the power receiving apparatus 101 placed on a charging stand 103. The power receiving apparatus 101 is sometimes referred to as an RX, and the power transmitting apparatus 102 is sometimes referred to as a TX hereinafter.

Reference numeral 104 denotes a range in which the RX can receive power from the TX. Note that the RX and the TX can have functions of executing applications other than wireless charging. An example of the RX is a smartphone, and an example of the TX is an accessory device configured to charge the smartphone. The RX and the TX may each be a storage device such as a hard disk drive or a memory device, or may be an information processing apparatus such as a personal computer (PC). Also, the RX and the TX may each be, for example, an image input apparatus such as an image capturing apparatus (a camera, a video camera, or the like) or a scanner, or may be an image output apparatus such as a printer, a copying machine, or a projector.

This system performs wireless power transmission using an electromagnetic induction method based on the WPC standard defined by the WPC (Wireless Power Consortium). That is, wireless power transmission for wireless charging based on the WPC standard is performed between the power receiving coil of the RX and the power transmitting coil of the TX. Note that the method of wireless power transmission (wireless power transmission method) is not limited to the method defined by the WPC standard, and may be another electromagnetic induction method, a magnetic field resonance method, a microwave method, or a method using a laser or the like. In this embodiment, wireless power transmission is used for wireless charging. However, wireless power transmission may be performed for an application purpose other than wireless charging.

In the WPC standard, the magnitude of power guaranteed when the RX receives power from the TX is defined by a value called Guaranteed Power (to be referred to as "GP" hereinafter). The GP represents a power value guaranteed to be output to the load (for example, a circuit for charging or the like) in the RX even if, for example, the positional relationship between the RX and the TX varies, and the transmission efficiency between the power receiving coil and the power transmitting coil decreases. For example, in a case in which the GP is 5 W, even if the positional relationship between the power receiving coil and the power transmitting coil varies, and the transmission efficiency decreases, the TX controls power transmission such that a power of 5 W can be output to the load in the RX.

The RX and the TX according to this embodiment perform communication for power transmission/reception control based on the WPC standard and communication for device authentication.

Communication for power transmission/reception control based on the WPC standard will be described first. In the WPC standard, a plurality of phases including phases before actual power transmission is performed and a power transfer phase in which power transmission is executed are defined, and communication for necessary power transmission control is performed in each phase. The phases before power transmission include a selection phase, a ping phase, an identification and configuration phase, a negotiation phase, and a calibration phase. Note that the identification and configuration phase will be referred to as an I & C phase hereinafter.

In the selection phase, the TX intermittently transmits an analog ping, and detects that an object exists in a power-transmittable range (also called an active area) (for example, that the RX or a conductor piece is placed on the charging stand 103). In the ping phase, the TX transmits a digital ping and receives a response from the RX that has received the digital ping, thereby recognizing that the detected object is the RX. In the I & C phase, the RX notifies the TX of identification information and ability information. In the negotiation phase, the value of GP is decided based on the value of GP requested by the RX, the power transmission capability of the TX, and the like. In the calibration phase, based on the WPC standard, the RX notifies the TX of the received power value, and the TX performs adjustment to efficiently transmit power. In the power transfer phase to execute wireless power transmission, control for continuing power transmission or stopping power transmission due to an error or full charging is performed.

The TX and the RX perform communication for power transmission/reception control by in-band communication that superimposes signals using the same antennas (coils) as in wireless power transmission based on the WPC standard. Note that the range in which the in-band communication based on the WPC standard can be performed between the TX and the RX is almost the same as the power-transmittable range. Hence, the range 104 shown in FIG. 1 represents a range in which wireless power transmission and in-band communication can be performed by the power transmitting and receiving coils of the TX and the RX. Note that in the following explanation, the RX is "placed" means that the RX has entered the range 104, and includes a state in which the RX is not actually placed on the charging stand 103.

Before deciding the GP, the RX according to this embodiment performs challenge/response-type communication using an electronic certificate with the TX, thereby performing device authentication of the TX. That is, communication for device authentication is performed before deciding the GP. Based on the result of device authentication, the RX decides the GP requested of the TX in the above-described negotiation phase. For example, the RX requests the TX for which device authentication is successful to set the GP to 15 W, and requests the TX for which device authentication is not successful to set the GP to 5 W.

Note that the GPs in a case in which device authentication is successful and in a case in which it is not are not limited to 15 W and 5 W. Any value can be used as long as the GP of the TX for which device authentication is successful is larger than the GP of the TX for which it is not. That is, the RX performs power transmission/reception by a large GP only with the TX for which device authentication is successful. As described above, when the GP is decided based on the result of device authentication, the RX can receive power by a large GP only from the TX that has passed a predetermined test defined by the WPC standard or the like and has been recognized to be capable of transmitting power by a large GP.

In this embodiment, the RX and the TX perform communication for device authentication using one of out-of-band communication using antennas and a frequency different from those in wireless power transmission and in-band communication that superimposes signals using the same antennas (coils) as those in wireless power transmission. Here, out-of-band communication can perform communication at a speed higher than in-band communication. If the TX can perform out-of-band communication, the RX performs communication for device authentication using out-of-band communication. Otherwise, the RX performs communication for device authentication using in-band communication. This processing will be described later.

As an example of out-of-band communication, in this embodiment, a communication method complying with the Bluetooth® Low Energy (to be referred to as "BLE" hereinafter) standard is used. The TX operates as the role of a Peripheral of BLE, and the RX operates as the role of a Central of BLE. However, the roles of BLE may be reversed. The communication method of out-of-band communication is not limited to BLE. For example, out-of-band communication may be performed by a communication method such as wireless LAN (for example, Wi-Fi®) of the IEEE802.11 standard series, ZigBee, or NFC (Near Field Communication). Note that if the TX can perform out-of-band communication, and the RX exists in the range 104, the RX and the TX can exchange information by out-of-band communication.

(2) Apparatus Arrangements

The arrangements of the power receiving apparatus 101 (RX) and the power transmitting apparatus 102 (TX) according to this embodiment will be described next. Note that the arrangement to be described below is merely an example, and a part (or a whole in some cases) of the arrangement to be described may be replaced with another arrangement for providing another similar function or may be omitted, and other arrangements may be added to the arrangement to be described. In addition, one block shown in the following description may be divided into a plurality of blocks, or a plurality of blocks may be integrated into one block.

Figure 2:
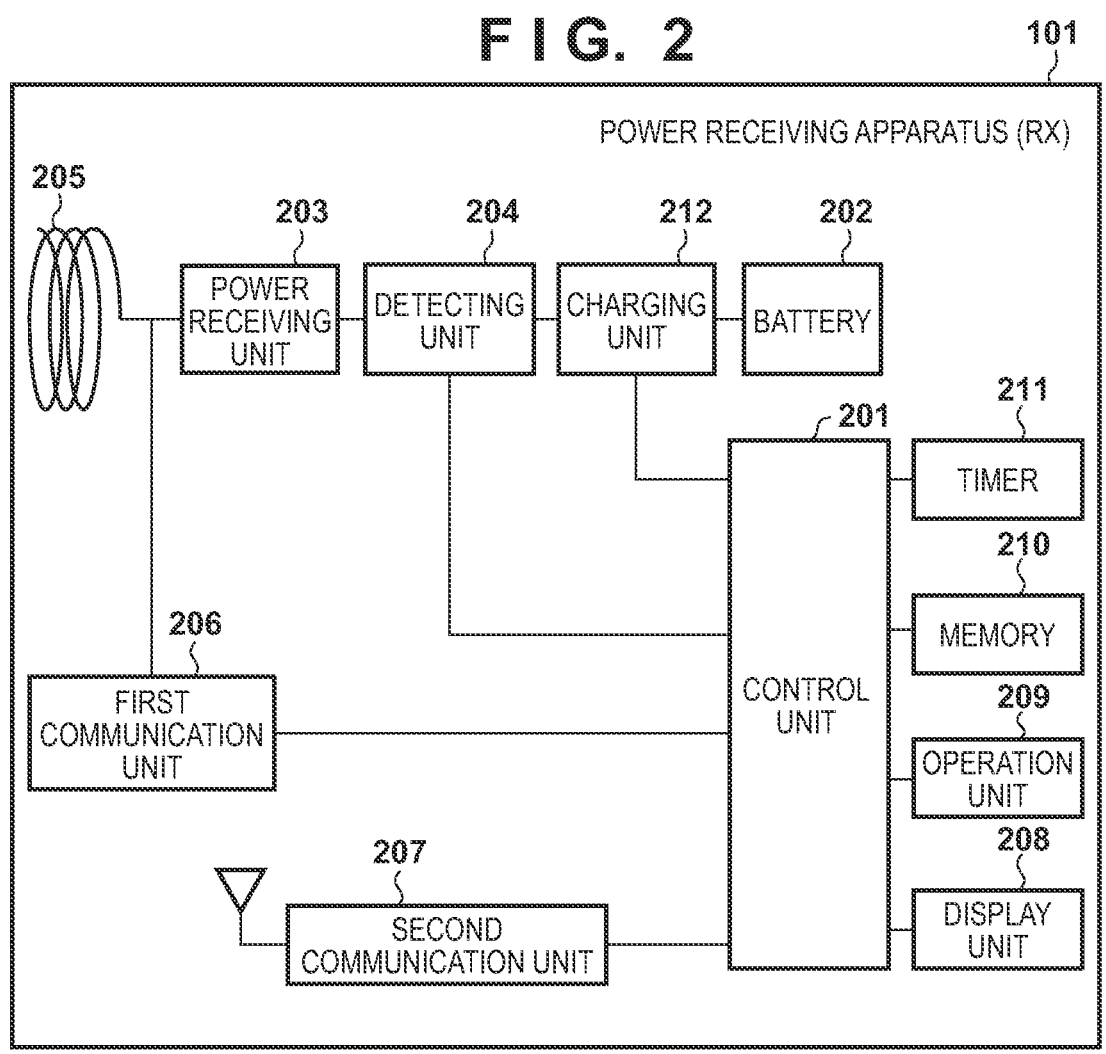
FIG. 2 is a block diagram showing an example of the arrangement of a power receiving apparatus according to the embodiment.

FIG. 2 is a block diagram showing an example of the arrangement of the RX according to this embodiment. In an example, the RX includes a control unit 201, a battery 202, a power receiving unit 203, a detecting unit 204, a power receiving coil 205, a first communication unit 206, a second communication unit 207, a display unit 208, an operation unit 209, a memory 210, a timer 211, and a charging unit 212.

The control unit 201 executes control programs stored in, for example, the memory 210, thereby controlling the entire RX and executing various kinds of processing to be described later. In an example, the control unit 201 performs control necessary for device authentication and power reception in the RX. The control unit 201 may perform control to execute applications other than wireless power transmission. The control unit 201 is configured to include, for example, one or more processors such as a CPU (Central Processing Unit) and an MPU (Micro Processing Unit). Note that the control unit 201 may be configured to include hardware such as an application specific integrated circuit (ASIC) dedicated to specific processing or an array circuit such as an FPGA (Field Programmable Gate Array) compiled to execute predetermined processing. The control unit 201 stores, in the memory 210, information that should be stored during execution of various kinds of processing. The control unit 201 can measure time using the timer 211.

The battery 202 supplies power necessary for, for example, control, power reception, and communication to the whole RX. In addition, the battery 202 accumulates power received via the power receiving coil 205. In the power receiving coil 205, an induced electromotive force (AC power by electromagnetic induction) is generated by an electromagnetic wave radiated from a power transmitting coil 305 (FIG. 3) of the TX. The power receiving unit 203 obtains the AC power generated by electromagnetic induction in the power receiving coil 205. The power receiving unit 203 converts the AC power into DC power or AC power of a predetermined frequency and supplies the power to the units of the RX including the charging unit 212. The charging unit 212 performs processing for charging the battery 202. In this way, the power receiving unit 203 supplies power to the load in the RX. The above-described GP represents electric energy guaranteed to be output from the power receiving unit 203.

The detecting unit 204 detects, based on the WPC standard, whether the RX is placed in the range 104 in which power can be received from the TX. The detecting unit 204 detects, for example, the voltage value or current value of the power receiving coil 205 when the power receiving unit 203 has received a digital ping of the WPC standard via the power receiving coil 205. For example, if the voltage upon receiving the digital ping is smaller than a predetermined voltage threshold, or if the current value is larger than a predetermined current threshold, the detecting unit 204 determines that the RX is placed in the range 104.

The first communication unit 206 performs control communication based on the WPC standard as described above by in-band communication with the TX. The first communication unit 206 obtains information transmitted from the TX by demodulating the electromagnetic wave input from the power receiving coil 205, and superimposing information to be transmitted to the TX on the electromagnetic wave by load-modulating the electromagnetic wave, thereby performing communication with the TX. That is, communication performed by the first communication unit 206 is superimposed on the power transmission from the power transmitting coil 305 of the TX.

The second communication unit 207 performs communication for device authentication with the TX by out-of-band communication. Note that in addition to this, the second communication unit 207 may perform communication other than the communication for device authentication. The second communication unit 207 includes a modulation/demodulation circuit and a communication protocol function necessary for performing communication complying with, for example, the BLE standard.

The display unit 208 presents information to the user by an arbitrary method such as a visual, auditory, or tactile method. The display unit 208 notifies the user of, for example, the state of the RX or the state of the wireless power transmission system including the TX and the RX as shown in FIG. 1. The display unit 208 is configured to include, for example, a liquid crystal display, an LED, a speaker, a vibration generation circuit, and other notification devices. The operation unit 209 has a function of accepting an operation of the user on the RX. The operation unit 209 is configured to include, for example, buttons, a keyboard, a voice input device such as a microphone, a motion detection device such as an acceleration sensor or a gyro sensor, and other input devices. Note that a device such as a touch panel that integrates the display unit 208 and the operation unit 209 may be used. The memory 210 stores various kinds of information, as described above. Note that the memory 210 may store information obtained by a functional unit different from the control unit 201. The timer 211 counts time by, for example, a count-up timer that measures time elapsed from an activation time or a count-down timer that counts down from a set time.

FIG. 3 is a block diagram showing an example of the arrangement of the TX according to this embodiment. In an example, the TX includes a control unit 301, a power supply unit 302, a power transmitting unit 303, a detecting unit 304, the power transmitting coil 305, a first communication unit 306, a second communication unit 307, a display unit 308, an operation unit 309, a memory 310, and a timer 311.

The control unit 301 executes control programs stored in, for example, the memory 310, thereby controlling the entire TX and executing various kinds of processing to be described later. In an example, the control unit 301 performs control necessary for device authentication and power transmission in the TX. The control unit 301 may perform control to execute applications other than wireless power transmission. The control unit 301 is configured to include, for example, one or more processors such as a CPU (Central Processing Unit) and an MPU (Micro Processing Unit). Note that the control unit 301 may be configured to include hardware such as an application specific integrated circuit (ASIC) dedicated to specific processing or an array circuit such as an FPGA (Field Programmable Gate Array) compiled to execute predetermined processing. The control unit 301 stores, in the memory 310, information that should be stored during execution of various kinds of processing. The control unit 301 can measure time using the timer 311.

The power supply unit 302 supplies power (DC or AC power) necessary for control, power transmission, and communication to the whole TX. The power supply unit 302 is, for example, a commercial power supply or a battery.

The power transmitting unit 303 converts the DC or AC power input from the power supply unit 302 into AC power of a frequency band to be used in wireless power transmission and inputs the AC power to the power transmitting coil 305, thereby generating an electromagnetic wave to be received by the RX. Note that the frequency of the AC power generated by the power transmitting unit 303 is several hundred kHz (for example, 110 kHz to 205 kHz) and is different from the communication frequency (2.4 GHz) of BLE used in out-of-band communication. The power transmitting unit 303 inputs the AC power to the power transmitting coil 305 based on an instruction from the control unit 301 such that the power transmitting coil 305 outputs the electromagnetic wave used to transmit power to the RX. In addition, the power transmitting unit 303 adjusts a voltage (power transmission voltage) or a current (power transmission current) to be input to the power transmitting coil 305, thereby controlling the intensity of the electromagnetic wave to be output. When the power transmission voltage or power transmission current is made large, the intensity of the embodiment increases. When the power transmission voltage or power transmission current is made small, the intensity of the embodiment decreases. Also, the power transmitting unit 303 performs output control of the AC power based on an instruction from the control unit 301 such that power transmission from the power transmitting coil 305 is started or stopped.

The detecting unit 304 detects, based on the WPC standard, whether an object exists in the range 104. The detecting unit 304 detects, for example, the voltage value or current value of the power transmitting coil 305 when the power transmitting unit 303 has transmitted an analog ping of the WPC standard via the power transmitting coil 305. If the voltage is smaller than a predetermined voltage value, or if the current value is larger than a predetermined current value, the detecting unit 304 can determine that an object exists in the range 104. Note that whether the object is the RX or another foreign substance is determined depending on whether a predetermined response is received for a digital ping transmitted by the first communication unit 306 using in-band communication. If a predetermined response is received for the digital ping, it is determined that the RX exists.

The first communication unit 306 performs control communication based on the WPC standard as described above by in-band communication with the RX. The first communication unit 306 modulates the electromagnetic wave output from the power transmitting coil 305, and transmits information to the RX. The first communication unit 306 obtains information transmitted from the RX by demodulating the electromagnetic wave output from the power transmitting coil 305 and modulated in the RX. In this way, communication performed by the first communication unit 306 is superimposed on the power transmission from the power transmitting coil 305.

The second communication unit 307 performs communication for device authentication with the RX by out-of-band communication. In addition to this, the second communication unit 307 may perform communication other than the communication for device authentication. The second communication unit 307 includes a modulation/demodulation circuit and a communication protocol function necessary for performing communication complying with, for example, the BLE standard.

The display unit 308 presents information to the user by an arbitrary method such as a visual, auditory, or tactile method. The display unit 308 notifies the user of, for example, information representing the state of the TX or the state of the wireless power transmission system including the TX and the RX as shown in FIG. 1. The display unit 308 is configured to include, for example, a liquid crystal display, an LED, a speaker, a vibration generation circuit, and other notification devices. The operation unit 309 has a function of accepting an operation of the user on the TX. The operation unit 309 is configured to include, for example, buttons, a keyboard, a voice input device such as a microphone, a motion detection device such as an acceleration sensor or a gyro sensor, and other input devices. Note that a device such as a touch panel that integrates the display unit 308 and the operation unit 309 may be used. The memory 310 stores various kinds of information, as described above. Note that the memory 310 may store information obtained by a functional unit different from the control unit 301. The timer 311 counts time by, for example, a count-up timer that measures time elapsed from an activation time or a count-down timer that counts down from a set time.

(3) Procedure of Processing

An example of the procedure of processing executed by the RX and the TX will be described next.

[3.1] Processing in Power Receiving Apparatus 101 (RX)

Figure 4B:
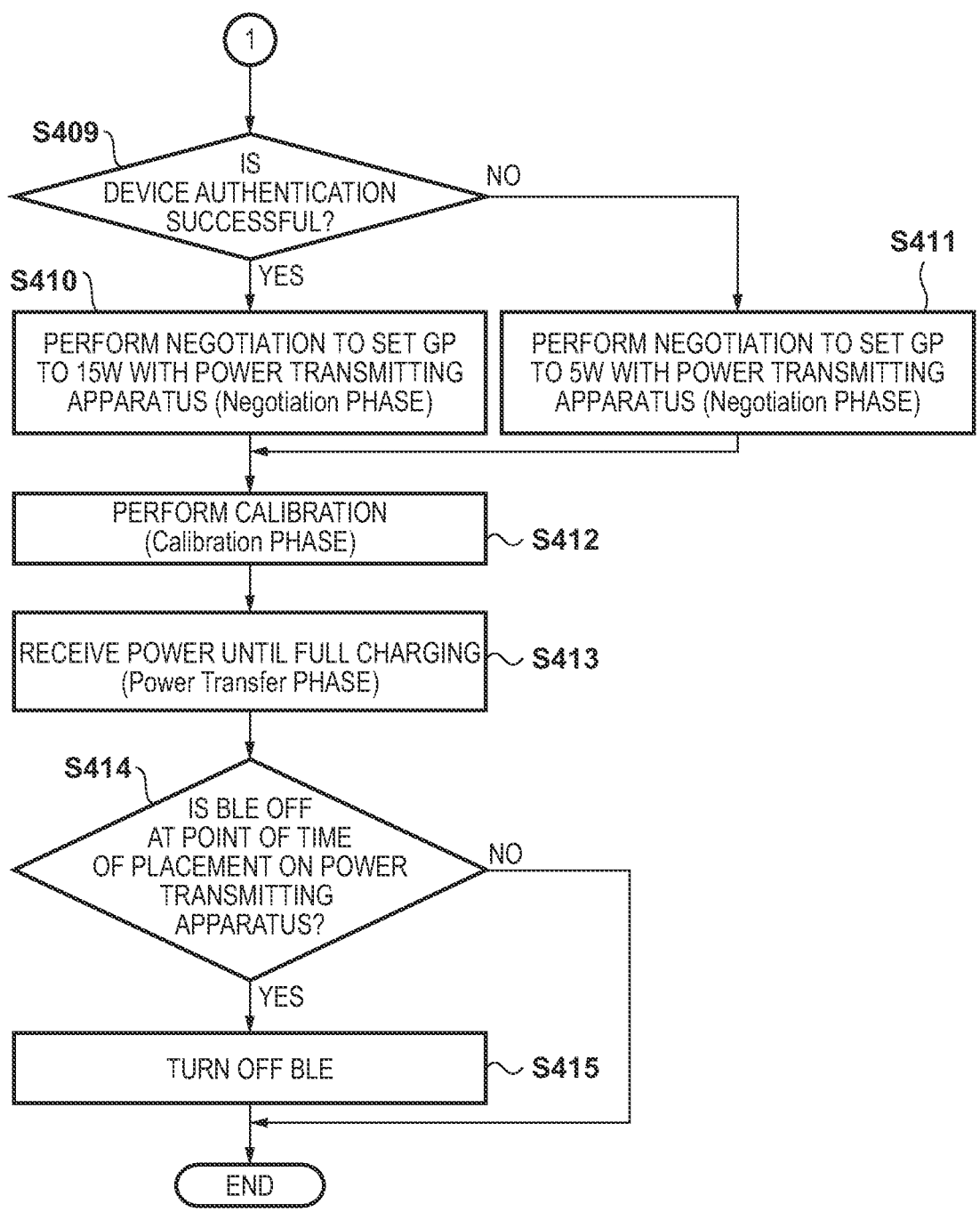

FIGS. 4A and 4B are flowcharts showing an example of processing executed by the RX. This processing can be implemented when, for example, the control unit 201 of the RX executes a program read out from the memory 210. Note that at least a part of the following procedure may be implemented by hardware. Hardware in this case can be implemented when, for example, a dedicated circuit using a gate array circuit such as an FPGA is automatically generated, using a predetermined compiler, from a program configured to implement the processing steps. This processing can be executed when the RX is activated by power supplied from the battery 202 or the TX in accordance with power-on of the RX, or when the user of the RX inputs a start instruction for a wireless charging application. This processing may be started by another trigger.

After the start of processing, the RX executes processing defied as the selection phase and the ping phase of the WPC standard, and waits for placement of the self-apparatus on the TX (step S401). The RX detects, for example, a digital ping from the TX, thereby detecting that the self-apparatus is placed on the TX. Upon detecting that the self-apparatus is placed on the TX, the RX transmits, using in-band communication, identification information and ability information to the TX by communication in the I & C phase defined by the WPC standard (step S402).

FIG. 7B shows the procedure of communication in the I & C phase. In the I & C phase, the RX transmits an identification packet (ID Packet) to the TX (step F711). The ID Packet stores an information element capable of specifying the corresponding version of the WPC standard as the ability information of the RX, in addition to a manufacturer code and a basic device ID that are identification information of an individual RX. The RX further transmits a configuration packet to the TX (step F712). The configuration packet includes, as the ability information of the RX, a maximum power value that is a value for specifying the maximum power that the RX can supply to a load, and information representing whether the RX has the negotiation function of the WPC standard. Here, the RX includes, in the ability information, information (BLE communication enable information) representing that BLE communication can be performed. The BLE communication enable information is thus transmitted as a part of the ability information by the configuration packet. Note that the communication enable information may be included in the ID Packet or another packet and transmitted. Upon receiving these packets, the TX transmits ACK (step F713), and the I & C phase ends.

Note that the RX may notify the TX of the identification information and the ability information of the RX by a method other than the communication in the I & C phase of the WPC standard. As the identification information of the individual RX, another arbitrary identification information capable of identifying the individual RX, such as a wireless power ID or a Bluetooth address (to be referred to as a "BD_ADDR" hereinafter) unique to the second communication unit 207 of the RX, may be used. The ability information may include information other than those described above.

Referring back to FIG. 4A, after step S402, the RX obtains ability information from the TX by in-band communication (step S403). The ability information of the TX can be obtained by, for example, a power transmitter capability packet (to be referred to as a "TX capability packet" hereinafter) of the WPC standard shown in FIG. 8 to be described later. The ability information from the TX may be obtained by another packet, as a matter of course. A description will be made below assuming that the TX capability packet is used as the ability information obtained from the TX.

When the ability information is obtained from the TX, the RX performs BLE communication start determination processing (step S404). Details of BLE communication start determination processing will be described later. Upon determining to start BLE communication (YES in step S405), the RX receives an advertising packet from the TX via the second communication unit 207, and transmits a CONNECT_REQ to the BD_ADDR of the transmission source, thereby establishing BLE connection (step S406). Note that in step S403, the BD_ADDR may be obtained from the TX by in-band communication, and in step S406, the CONNECT_REQ may directly be transmitted to the BD_ADDR to establish BLE connection without waiting for the advertising packet. Next, the RX performs communication for device authentication with the TX by the BLE communication whose connection is established above (step S407).

The contents of communication for device authentication performed between the RX and the TX will be described here with reference to FIG. 7A. Note that device authentication according to this embodiment is challenge/response-type device authentication using an electronic certificate, and the RX authenticates the TX. Note that the TX may authenticates the RX, or both may authenticate the partner. The RX operates as an initiator that transmits a challenge text to the TX, and the TX operates as a responder that encrypts the challenge text received from the RX and transmits it to the RX.

First, the RX transmits a GET_DIGESTS message to the TX (step F701). The GET_DIGESTS is a message for requesting information concerning an electronic certificate held by the receiver (TX). The TX transmits a DIGESTS to the RX in response to the GET_DIGESTS (step F702). The DIGESTS is information concerning the electronic certificate held by the transmitter (TX). Next, the RX transmits, to the TX, a GET_CERTIFICATE message for requesting detailed information (CERTIFICATE) concerning the electronic certificate (step F703). The TX transmits a CERTIFICATE to the RX in response to the GET_CERTIFICATE from the RX (step F704). The RX transmits a CHALLENGE message including a challenge text to the TX (step F705), and the TX transmits, to the RX, a RESPONSE generated by encrypting the challenge text received from the RX (step F706).

If the authenticity of the RESPONSE received from the TX is confirmed, the RX transmits a RESULT (success) to the TX (step F707), and ends device authentication. The RESULT (success) means that the authenticity of the RESPONSE can be confirmed, and device authentication has succeeded. Note that if device authentication has failed, a RESULT (fail) is transmitted in place of the RESULT (success), and device authentication is ended. Note that upon receiving a message representing that the partner apparatus (TX) does not support the communication for device authentication the initiator (RX) determines that the partner apparatus does not support device authentication. If the response is not received during the communication, the initiator (RX) may perform retry by, for example, resending a message for obtaining the response or may determine that the partner apparatus does not support device authentication. The RX may not perform communication for device authentication with the TX that does not support device authentication and may determine that the result of device authentication is not a success.

Note that the above-described messages are transmitted/received by one of read, write, notify, and indicate of the characteristics of the GATT service defined in advance in GATT communication in the BLE connection. The GATT communication is performed by transmitting/receiving packets standardized by BLE. When the communication for device authentication is completed, the RX transmits an LL_TERMINATE_IND of BLE, thereby disconnecting the BLE connection. Note that the BLE connection may be disconnected from the TX. Note that if another application uses the BLE connection, the BLE connection may not be disconnected even after the end of the communication for device authentication. Additionally, before the communication for device authentication, the RX can obtain, by the advertising packet or GATT communication of BLE, information representing whether the TX supports device authentication. If the TX does not support device authentication, the RX may determine that the TX does not support device authentication, and may not execute the communication shown in FIG. 7A.

On the other hand, if BLE communication is not started after step S404 (NO in step S405), communication for device authentication described with reference to FIG. 7A is performed with the TX using in-band communication (step S408). At this time, the messages exchanged in the communication for device authentication are transmitted/received between the TX and the RX as the packets of in-band communication.

After the communication for device authentication is executed by BLE or in-band communication (step S407 or S408), the RX executes negotiation with the TX based on the result of device authentication (step S409). If device authentication is successful (YES in step S409), the RX performs the negotiation to set the GP to 15 W (step S410). Otherwise (NO in step S409), the RX performs the negotiation to set the GP to 5 W (step S411).

In the negotiation, communication in the negotiation phase of the WPC standard, as shown in FIG. 1C, is performed. First, the RX transmits a specific request to the TX, thereby notifying the TX of the requested value of GP (step F721). That is, if device authentication is successful, the TX is notified of GP=15 W. Otherwise, the TX is notified of GP=5 W. The TX determines, based on the power transmission capability of the self-apparatus, whether to accept the request. If the request is to be accepted, an ACK is transmitted to the RX. If the request is not to be accepted, an NAK is transmitted to the RX (step F722).

Here, if the magnitude of the GP requested by the RX is a magnitude transmittable by the power transmission capability of the self-apparatus, the TX accepts the request of the RX. At this time, the value of GP is decided to the same as the value requested by the RX. On the other hand, if the magnitude of the GP requested by the RX is a magnitude that cannot be achieved by the power transmission capability of the self-apparatus, the TX does not accept the request of the RX. In this case, for example, a small value defined in advance by the WPC standard can be decided as the value of GP. Note that a small value other than the value defined by the WPC standard may be decided as the value of GP at this time. In an example, these small values are stored in advance in the memory 210 of the RX or the memory 310 of the TX.

Note that if the TX can simultaneously transmit power to a plurality of RXs, and is already transmitting power to another RX, the TX may decide the value of GP based on the current power transmission remaining capacity in place of the power transmission capability of the self-apparatus. Additionally, in steps S410 and S411, communication in the negotiation phase of the WPC standard is used. However, the present disclosure is not limited to this, and another procedure of deciding the GP based on the result of device authentication between the TX and the RX may be executed. Upon obtaining information representing that the RX does not support the negotiation phase (for example, in step S402), the TX may set the value of GP to a smaller value (for example, defined in advance by the WPC standard) without performing communication in the negotiation phase.

Referring back to FIG. 4B, after deciding the GP, the RX performs calibration (step S412) and power reception (step S413) up to full charging based on the GP. Calibration is processing of, concerning the power that the TX has transmitted to the RX, adjusting the correlation between the value measured in the TX by the TX and the value of the received power measured in the RX. The TX performs this processing by processing in the calibration phase of the WPC standard. The power reception up to full charging is performed by processing in the power transfer phase of the WPC standard. Procedures by the WPC standard can be used for the calibration and the power reception in steps S412 and S413. However, the calibration and the power reception may be performed by a method other than the WPC standard.

If full charging is obtained in the power transfer phase, the RX transmits an end power transfer of the WPC standard. Accordingly, power transmission front the TX is stopped, and the series of processing for wireless charging is ended. After the end of the series of processing for wireless charging, if BLE is OFF at the point of time of placement on the TX (YES in step S414), the RX turns off BLE (step S415), and ends the processing. Note that if the BLE connection is used by another application, BLE may not be turned off. On the other hand, if BLE is ON (NO in step S414), the processing is ended without doing anything. After that, the RX may return to step S401, or may return to step S401 after waiting for another trigger for the start, for example, a decrease of the battery remaining amount to a predetermined amount or less.

Figure 5:
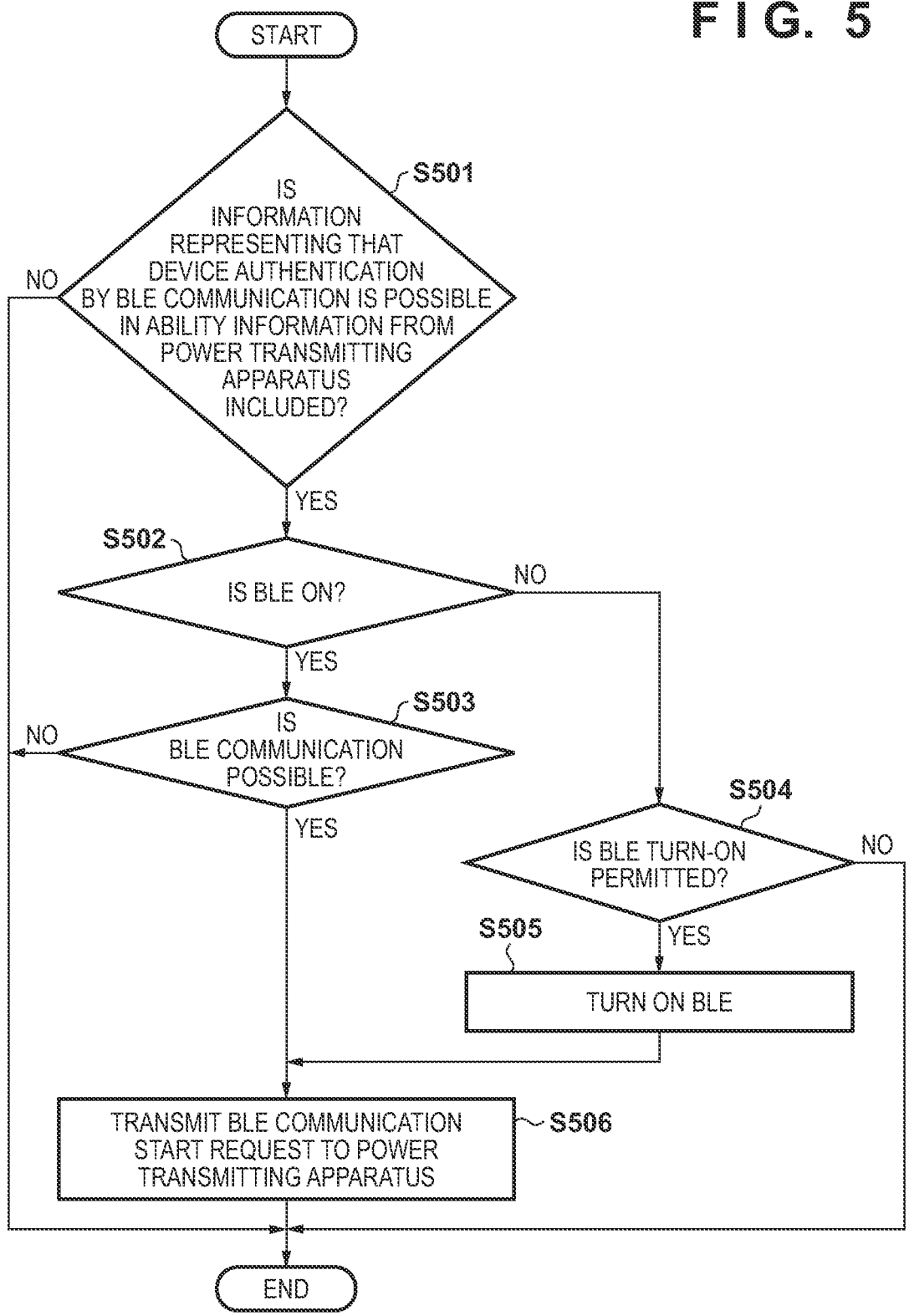
FIG. 5 is a flowchart showing an example of the procedure of BLE communication start determination processing.

FIG. 5 is a flowchart showing an example of BLE communication start determination processing (step S404) executed by the RX. This processing can be implemented when, for example, the control unit 201 of the RX executes a program read out from the memory 210. Note that at least a part of the following procedure may be implemented by hardware. Hardware in this case can be implemented when, for example, a dedicated circuit using a gate array circuit such as an FPGA is automatically generated, using a predetermined compiler, from a program configured to implement the processing steps. This processing can be executed when ability information is received from the TX. However, this processing may be started by another trigger.

The RX checks whether information representing that device authentication by BLE communication is possible is included in the ability information obtained from the TX in step S403 (step S501). Whether information representing that device authentication by BLE communication is possible is included can be determined by, for example, collating a bit representing a capability of performing device authentication using out-of-band communication, which is included in the ability information, a bit representing holding of BLE, a bit representing whether BLE is usable, or the like. If information representing that device authentication by BLE communication is possible is included in the ability information obtained from the TX (YES in step S501), the RX determines whether BLE of the self-apparatus is ON (whether BLE is in an enabled state) (step S502). On the other hand, if information representing that device authentication by BLE communication is possible is not included in the ability information obtained from the TX (NO in step S501), the processing is ended without doing anything.

If BLE is enabled (ON) (YES in step S502), the RX determines whether BLE communication by the second communication unit 207 is possible (step S503). Here, if the BLE communication function is used with another application or communication device, or if the BLE communication function plays a role of a Peripheral, the RX determines that BLE communication is impossible. Alternatively, if the remaining amount of the battery 202 is small, the RX may determine that BLE communication is impossible. If BLE communication is possible (YES in step S503), the RX transmits a BLE communication start request to the TX (step S506), and ends the processing. The BLE communication start may be requested by, for example, an Out Of Band Request Packet (to be referred to as an "OOB Req Packet" hereinafter) of the WPC standard, or may be requested by another packet. On the other hand, if BLE communication is impossible (NO in step S503), the processing is ended without doing anything.

If BLE is in a disabled state (BLE is not ON) (NO in step S302), the RX determines whether BLE turn-on is permitted by the user (step S504). BLE turn-on permission by the user can be done by, for example, displaying an inquiry display 900 as shown in FIG. 9A on the display unit 208 by full screen display or a pop-up window and selecting a region 901 to instruct permission by the user. On the other hand, prohibition of enabling of BLE (turn-on of BLE) can be done by selecting a region 902 to instruct prohibition by the user in the inquiry display 900. Note that in a case in which the result of user selection is stored, and BLE turn-on was permitted by a previous operation, it may be determined that turn-on is permitted without performing the inquiry display 900.

Figure 9B:
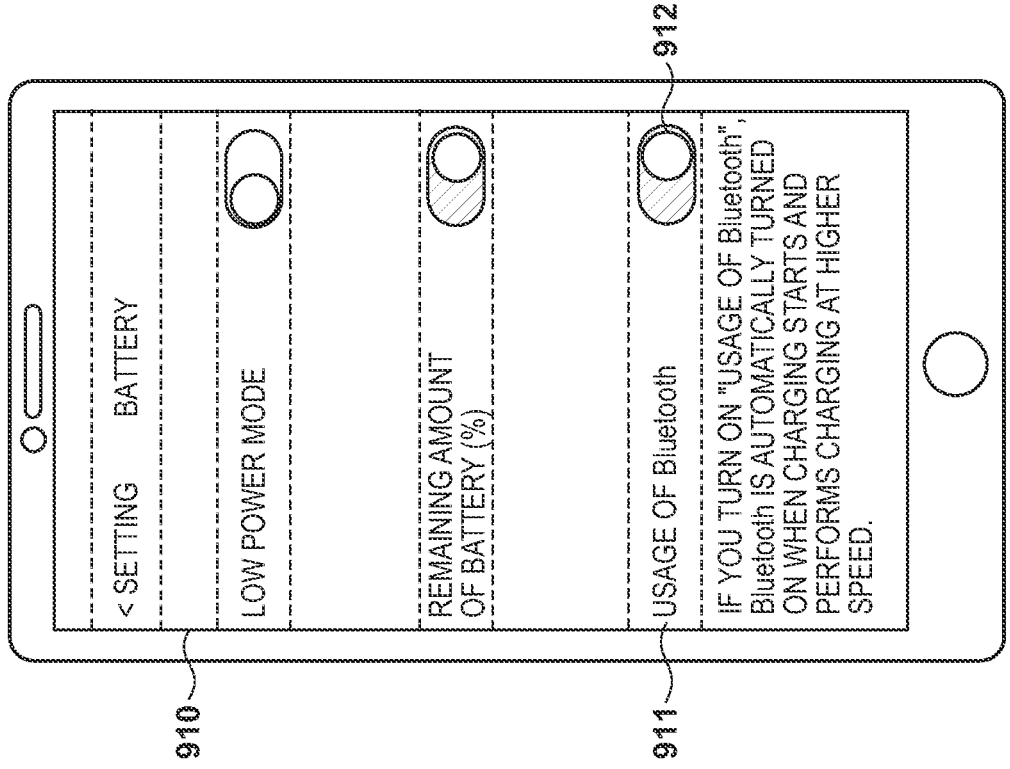
FIG. 9B is a view showing an example of display configured to set BLE turn-on permission in advance.
Figure 9A:
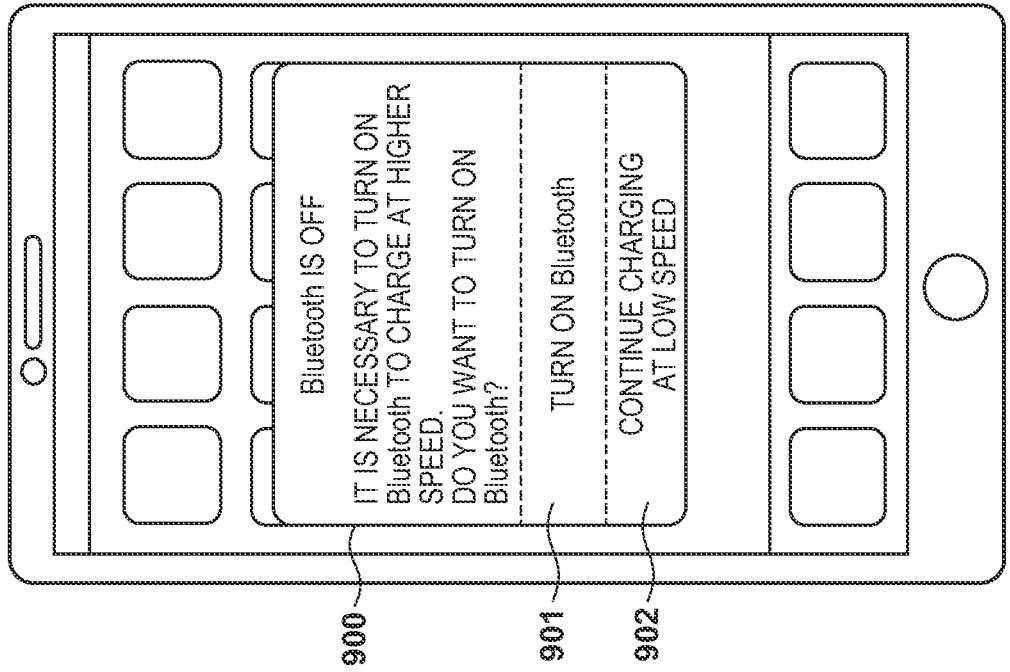
FIG. 9A is a view showing an example of display configured to inquire about BLE turn-on permission.

Alternatively, permission may be done by displaying an item 911 concerning BLE turn-on permission in a setting display 910 of the RX as shown in FIG. 9B and enabling the item 911 by the user in advance using a button 912. In this case as well, it may be determined that BLE turn-on is permitted without performing the inquiry display 900. If no operation is performed in the inquiry display 900 for a predetermined time, it may be determined that BLE turn-on is not permitted.

If enabling of BLE is permitted (YES in step S504), BLE is enabled (ON) (step S505). After that, the RX transmits the BLE communication start request to the TX (step S506), and ends the processing. On the other hand, if BLE turn-on is not permitted (NO in step S504), the processing is ended without doing anything.

[3.2] Processing in Power Transmitting Apparatus

Figure 6:
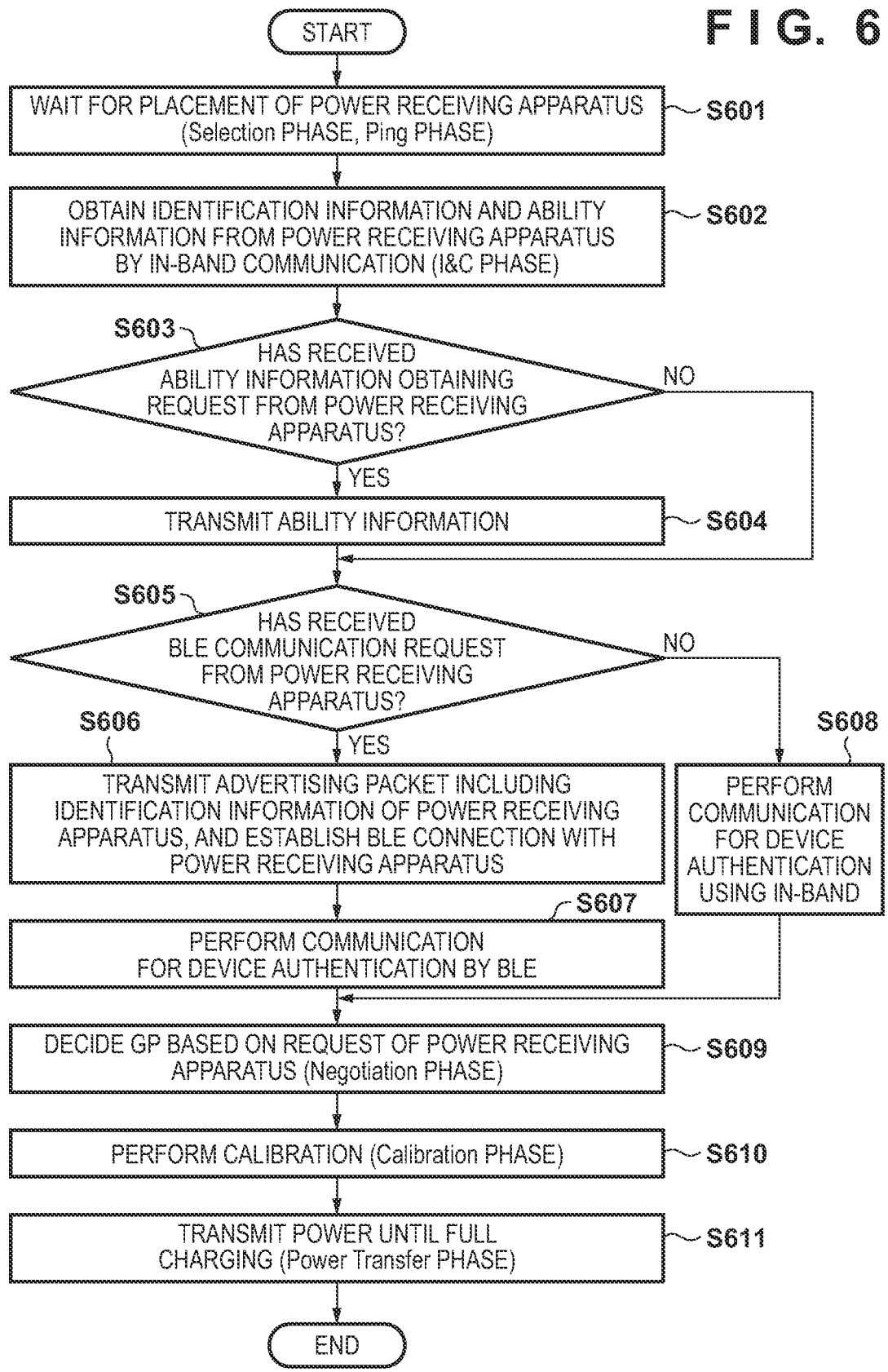
FIG. 6 is a flowchart showing an example of the procedure of processing of the power transmitting apparatus.

An example of the procedure of processing executed by the TX will be described next with reference to FIG. 6. This processing can be implemented when, for example, the control unit 301 of the TX executes a program read out from the memory 310. Note that at least a part of the following procedure may be implemented by hardware. Hardware in this case can be implemented when, for example, a dedicated circuit using a gate array circuit such as an FPGA is automatically generated, using a predetermined compiler, from a program configured to implement the processing steps. This processing can be executed when the power supply of the TX is turned on, when the user of the TX inputs a start instruction for a wireless charging application, or when the TX is connected to a commercial power supply and receives power supply. This processing may be started by another trigger.

In this processing, first, the TX executes processing defined as the selection phase and the ping phase of the WPC standard, and waits for placement of the RX (step S601). The TX repetitively intermittently transmits an analog ping of the WPC standard, and detects an object existing in the power-transmittable range (selection phase). Upon detecting that an object exists in the power-transmittable range, the TX transmits a digital ping. If a predetermined response to the digital ping is received, the TX determines that the detected object is the RX, and the RX is placed on the charging stand 103 (ping phase).

Upon detecting the placement of the RX, the TX executes communication in the above-described I & C phase by in-band communication, and obtains identification information and ability information from the RX (step S602). Next, the TX waits for reception of an ability information obtaining request from the RX (step S603). Upon receiving the ability information obtaining request (YES in step S603), the TX transmits ability information (step S604). If the ability information obtaining request cannot be received (NO in step S603), the TX performs nothing, and waits for reception of a BLE communication start request from the RX (step S605).

In this embodiment, 1 bit in bit6 to bit7 (800) of Bank1, which is a reserved region of a TX capability packet shown in FIG. 8, or in bit2 to bit7 (801) of Bank2 is assigned as an Auth bit. The Auth bit is an example of ability information. The TX writes "1" in the Auth bit if it has a capability of performing device authentication using out-of-band communication or supports device authentication using out-of-band communication, and writes "0" otherwise. The TX assigns a BLE bit to 1 bit of the reserved region. The TX writes "1" in the BLE bit if it has a capability of using BLE for out-of-band communication or includes BLE usable for control communication, and writes "0" otherwise. Also, the TX assigns a BLE enable bit to 1 bit of the reserved region. The TX writes "1" in the BLE enable bit if it can use BLE as out-of-band communication at that point of time, and writes "0" otherwise. Note that a bit concerning NFC or Wi-Fi may be included as the type of out-of-band communication, and the present disclosure is not limited to the above-described form. In addition, although the information representing whether the TX has the capability of performing device authentication using out-of-band communication or supports device authentication using out-of-band communication may be represented only by the Auth bit, the present disclosure is not limited to this. For example, information representing whether the TX supports out-of-band communication and information representing whether the TX supports device authentication may be represented by different bits.

Referring back to FIG. 6, upon receiving a BLE communication start request (YES in step S605), the TX transmits an advertising packet of BLE including the identification information of the TX, and establishes BLE connection with the RX placed on the self-apparatus (step S606). Next, in the BLE connection established in step S606, the TX performs communication for device authentication with the RX, which has been described with reference to FIG. 7A (step S607). On the other hand, if the BLE communication start request cannot be received from the RX in step S605 (NO in step S605), the TX performs communication for device authentication described with reference to FIG. 7A using in-band communication (step S608). After that, the TX performs negotiation shown in FIG. 7C with the RX, and decides the GP (step S609). After deciding the GP, the TX performs calibration (step S610) and power transmission (step S611) up to full charging based on the GP.

Upon receiving an end power transfer of the WPC standard from the RX, the TX ends the processing in any processing phase in accordance with the WPC standard, stops power transmission, and returns to the selection phase in step S601. Note that even in a case of full charging, since the end power transfer is transmitted from the RX, the TX returns to the selection phase in step S601.

[3.3] Operation of System

For the operation sequences of the RX and the TX, which have been described with reference to FIGS. 4A to 6, several situations will be assumed and described. Note that in the initial state, the RX is not placed on the TX, and the TX has a sufficient power transmission capability to transmit power by a GP requested by the RX.

First Processing Example

The first processing example will be described first with reference to FIG. 10. In the first processing example, the TX is a device that holds the function of out-of-band communication by the second communication unit 307, that is, BLE, is in a state in which BLE communication is possible, and succeeds device authentication of the RX. In the RX, BLE is OFF at the time of placement, BLE turn-on is not permitted in advance, and it is necessary to obtain permission from the user by inquiring whether to permit BLE turn-on.

First, the TX waits for placement of an object by an analog ping (steps S601 and F1001). When the RX is placed (step F1002), a change occurs in the analog ping (step F1003), and the TX detects placement of the object (step F1004). The RX detects, by a subsequent digital ping, that the self-apparatus is placed on the TX (steps S401, F1005, and F1006). In addition, the TX detects, by the response to the digital ping, that the placed object is the RX. Next, by communication in the I & C phase, the TX is notified of information representing that BLE communication is possible (steps S402, S602, and F1007). Next, the RX transmits an ability information obtaining request (steps S403 and F1008), and the TX transmits ability information (YES in step S603 and steps S604 and F1009).

Upon receiving the ability information from the TX, the RX starts BLE communication start determination processing (step S404). Since the ability information of the TX includes information representing that device authentication by BLE communication is possible, the RX confirms whether BLE of the self-apparatus is ON (YES in step S501 and step S502). Since BLE of the self-apparatus is OFF, and BLE turn-on is not permitted in advance, the RX performs the display 900 for inquiring whether to permit BLE turn-on (NO in step S502 and step F1010). If BLE turn-on is permitted by the user, the RX turns on BLE (YES in step S504 and steps S505 and F1011), and transmits a BLE communication start request to the TX (steps S506 and F1012). Upon receiving the BLE communication start request, the TX transmits an advertising packet of BLE (step F1013), and the RX transmits a CONNECT_REQ (step F1014), thereby establishing BLE connection (YES in step S405, step S406, YES in step S605, and step S606).

Next, communication is performed for device authentication by BLE, and device authentication succeeds (steps S407, S607, and F1015). Since device authentication succeeds, GP=15 W is decided by negotiation between the RX and the TX (YES in step S409 and steps S410, S608, and F1016). After that, calibration (steps S412, S609, and F1017) and transmission/reception until full charging are performed (steps S413, S610, and F1018). If full charging is obtained, the RX transmits an end power transfer, and the processing is ended (step F1019).

According to the above-described operation, if the RX in a state in which BLE of the self-apparatus is OFF is placed on the TX capable of performing out-of-band communication by BLE, the RX can perform communication for device authentication by turning on BLE, and receive power based on the result of device authentication.

Second Processing Example

The second processing example will be described next with reference to FIG. 11. In the second processing example, in the initial state, the RX is not placed on the TX, and BLE is OFF. A description will be made assuming that BLE turn-on is permitted in advance by the user. Differences from FIG. 10 will mainly be described below.

In FIG. 11, processing from placement detection to ability information transmission by the TX (steps F1101 to F1109) is the same as in FIG. 10 (steps F1001 to F1009). Upon receiving ability information from the TX, the RX starts BLE communication start determination processing (step S404). Since BLE turn-on is permitted in advance by the user, the RX automatically turns on BLE without inquiring whether to permit BLE turn-on (NO in step S502, YES in step S504 and steps S505 and F1110). The operation (steps F111 1 to F1118) until full charging is the same as the operation in FIG. 10 (steps F1012 to F1019). According to the above-described operation, if the RX is placed on the TX capable of performing out-of-band communication by BLE, the RX can perform communication for device authentication by automatically turning on BLE without making the user conscious of the state of BLE and receive power based on the result.

Third Processing Example

The third processing example will be described next with reference to FIG. 12. In the third processing example, in the initial state, the RX is not placed on the TX, and BLE is OFF. A description will be made assuming that BLE turn-on is not permitted in advance by the user, and turn-on is not permitted because of absence of a user operation for an inquiry about whether to permit BLE turn-on. Differences from FIG. 10 will mainly be described below.

Figure 12:
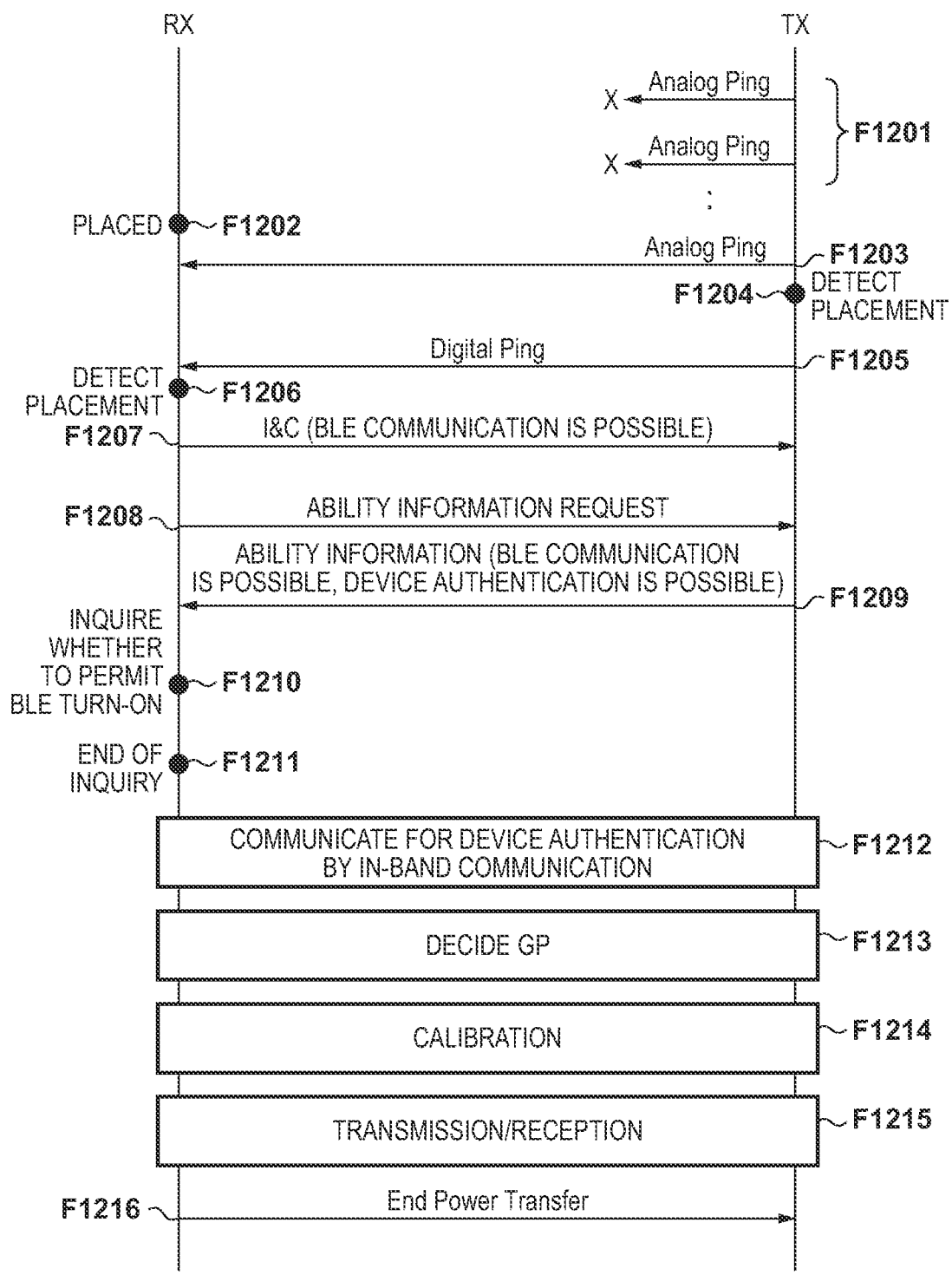
FIG. 12 is a view showing the third processing example executed by the wireless power transmission system according to the embodiment.

In FIG. 12, processing from placement detection to inquiry display concerning whether to permit BLE turn-on (steps F1201 to F1210) is the same as in FIG. 10 (steps F1001 to F1010). Since no user operation is performed for a predetermined time from the inquiry display, the RX ends the inquiry display, and determines that BLE turn-on is not permitted (NO in step S504 and step F1211). Since BLE turn-on is not permitted, the RX performs communication for device authentication by in-band communication, and device authentication succeeds (NO in step S405 and steps S408 and F1212). The operation (steps F1213 to F1216) until full charging is the same as in FIG. 10 (steps F1016 to F1019).

According to the above-described operation, if the RX is placed on the TX capable of performing out-of-band communication by BLE, and BLE turn-on is not permitted by the user, the RX performs communication for device authentication by in-band communication without turning on BLE and receives power based on the result.

As described above in the first to third processing examples, even if the RX is placed on the TX capable of performing out-of-band communication by BLE in a state in which BLE is OFF, the RX according to this embodiment can perform communication for device authentication by out-of-band communication by turning on BLE. Here, since out-of-band communication can perform communication at a speed higher than in-band communication, the time necessary for communication for device authentication is shorter when out-of-band communication is used. Hence, the time from placement of the RX to the start of charging can be reduced. Even in a case in which BLE turn-on is not permitted by the user, since communication for device authentication can be performed by in-band communication, charging can be started without any influence of the state of BLE.

Note that in this embodiment, if no user operation is performed for a predetermined time for an inquiry about whether to permit BLE turn-on, the inquiry display is ended, it is determined that BLE turn-on is not permitted, and device authentication using in-band communication is performed. However, the inquiry display need not always be ended. In addition, when BLE turn-on is permitted by the user during device authentication using in-band communication, device authentication by in-band communication may be interrupted, and processing may be switched to device authentication using out-of-band communication by turning on BLE. This can reduce the time necessary for communication for device authentication as compared to a case in which device authentication using in-band communication is continued, and can reduce the time until the start of charging. On the other hand, if the processing phase of device authentication executed on in-band communication progresses, device authentication using in-band communication may be continued without turning on BLE. It is therefore possible to prevent the time necessary for communication for device authentication from being prolonged by the time necessary for establishment of BLE connection. Also, the inquiry display may be ended when device authentication using in-band communication is ended.

In this embodiment, a case in which device authentication is applied as a function using out-of-band communication has been described. However, another function executable using out-of-band communication may be applied. For example, it may be firmware updating or the like of the TX. In this case, the TX assigns 1 bit in bit6 to bit7 (800) of Bank1, which is a reserved region of a TX capability packet, or in bit2 to bit7 (801) of Bank2 to a firmware update bit. The TX writes "1" in the firmware update bit if it has a capability of performing firmware updating using out-of-band communication, and writes "0" otherwise. In this way, when out-of-band communication is applied to a function that needs communication with a large data amount, the time necessary for communication for the function can greatly be reduced.

In this embodiment, one type of communication method BLE is used as out-of-band communication. However, the RX may have a function of performing communication by a plurality of communication methods, and use one of these as out-of-band communication. In this case, the ability information transmitted/received in steps S402 and S403 of FIG. 4A may include information representing whether communication by another communication method is possible in addition to the information representing whether BLE communication is possible. Additionally, in the BLE communication start determination processing (steps S501 to S506) shown in FIG. 5, in accordance with the received ability information, control may be executed such that if communication of another communication method is OFF, the communication is turned on. In a case in which, for example, the RX is placed on any of a TX capable of performing BLE communication and a TX capable of performing Wi-Fi communication, device authentication can be executed in a short time using out-of-band communication faster than in-band communication.

Note that in the embodiment, an example in which control information for device authentication executed before the start of wireless power transmission is transmitted/received using the second communication unit 207 of the RX and the second communication unit 307 of the TX has been described. However, the control information transmitted/received by the above-described control is not limited to information used for device authentication, and the embodiment can be applied to transmission/reception of various kinds of control information.

As described above, according to the embodiment, appropriate communication is used in device authentication, and the time necessary for device authentication is reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-224822, filed Dec. 12, 2019, which is hereby incorporated by reference herein in its entirety.

What is claimed is:

1. A power receiving apparatus comprising:
a coil configured to wirelessly receive power from a power transmitting apparatus and configured to perform communication using a first communication method;
a communication device configured to perform communication using a second communication method; and
one or more processors configured to:
inquire a user whether to enable communication functionality of the communication device, in a case where functionality of communication using the second communication method is supported by the power transmitting apparatus and in a case where the communication functionality of the communication device is in a disabled state;
enable the communication functionality of the communication device in a case where an operation of instructing permission is performed for the inquiry; and
execute authentication with the power transmitting apparatus using the second communication method after the communication functionality of the communication device has been enabled.

2. The apparatus according to claim 1, wherein the authentication executed before power transfer phase.

3. The apparatus according to claim 1, wherein information representing whether the authentication functionality is supported by the power transmitting apparatus is obtained using the first communication method.

4. The apparatus according to claim 1, wherein communication for the authentication using the second communication method is requested using the first communication method.

5. The apparatus according to claim 1, wherein in a case where an operation of instructing prohibition is performed for the inquiry, the one or more processors do not enable the communication functionality of the communication device.

6. The apparatus according to claim 5, wherein the one or more processors executes the authentication with the power transmitting apparatus using the first communication method.

7. The apparatus according to claim 1, wherein in a case where an operation for the inquiry is not performed for a predetermined time, the one or more processors do not enable the communication functionality of the communication device.

8. The apparatus according to claim 7, wherein the second execution unit executes the authentication with the power transmitting apparatus using the first communication method.

9. The apparatus according to claim 1, wherein in a case where an operation of instructing permission is performed for the inquiry during execution of the authentication with the power transmitting apparatus using the first communication method, the one or more processors interrupt the authentication using the first communication method, enable the communication functionality of the communication device, and execute the authentication with the power transmitting apparatus using the second communication method.

10. The apparatus according to claim 1, wherein in a case where an operation of instructing permission is performed for the inquiry after the authentication with the power transmitting apparatus is completed, the one or more processors do not enable the communication functionality of the communication device.

11. The apparatus according to claim 1, further comprising one or more memories configured to store that an operation of instructing permission is performed for the inquiry,
wherein in a case where functionality of communication using the second communication method is supported by the power transmitting apparatus, in a case where the communication functionality of the communication device is disabled, and in a case where the one or more memories stores that the operation of instructing permission is performed, the one or more processors enables the communication unit functionality of the communication device without performing the inquiry.

12. The apparatus according to claim 1, wherein the one or more processors are further configured to set, in advance, permission to enable the communication functionality of the communication device,
wherein, in a case where functionality of communication using the second communication method is supported by the power transmitting apparatus, in a case where the communication functionality of the communication device is disabled, and in a case where the permission is set in advance, the one or more processors enables the second communication functionality of the communication device without performing the inquiry.

13. The apparatus according to claim 1, wherein the second communication method is a communication method in accordance with a standard of Bluetooth® Low Energy.

14. A power transmitting apparatus comprising:
a first coil configured to wirelessly transmit power to a power receiving apparatus and configured to perform communication using a first communication method, the power receiving apparatus comprising:
a second coil configured to wirelessly receive power from a power transmitting apparatus and configured to perform communication using the first communication method;
a communication device configured to perform communication using a second communication method; and
one or more processors configured to:
inquire a user whether to enable communication functionality of the communication device, in a case where functionality of communication using the second communication method is supported by the power transmitting apparatus and in a case where the communication functionality of the communication device is in a disabled state;
enable the communication functionality of the communication device in a case where an operation of instructing permission is performed for the inquiry; and
execute authentication with the power transmitting apparatus using the second communication method after the communication functionality of the communication device has been enabled; and one or more processors configured to authentication with the power receiving apparatus using the second communication method.

15. A control method of a power receiving apparatus that includes a coil configured to wirelessly receive power from a power transmitting apparatus and configured to perform communication using a first communication method and a communication unit device configured to perform communication using a second communication method, the control method comprising:

inquiring a user whether to enable communication functionality of the communication device, in a case where functionality of communication using the second communication method is supported by the power transmitting apparatus and in a case where the communication functionality of the communication device is in a disabled state;

enabling the communication functionality of the communication device in a case where an operation of instructing permission is performed for the inquiry; and executing authentication with the power transmitting apparatus using the second communication method after the communication functionality of the communication device has been enabled.

16. A control method of a power transmitting apparatus that includes a first coil configured to wirelessly transmit power to a power receiving apparatus and configured to perform communication using a first communication method, wherein the power receiving apparatus comprises a second coil configured to wirelessly receive power from a power transmitting apparatus and configured to perform communication using the first communication method; and a communication device configured to perform communication using a second communication method, wherein the power receiving apparatus is configured to:

inquire a user whether to enable communication functionality of the communication device, in a case where functionality of communication using the second communication method is supported by the power transmitting apparatus and in a case where the communication functionality of the communication device is in a disabled state; enable the communication functionality of the communication device in a case where an operation of instructing permission is performed for the inquiry; and execute authentication with the power transmitting apparatus using the second communication method after the communication functionality of the communication device has been enabled; and another communication device configured to perform communication using the second communication method, the control method comprising executing the authentication with the power receiving apparatus via using the second communication method.

17. A non-transitory computer-readable storage medium storing a program configured to cause a computer of a power receiving apparatus that includes a coil configured to wirelessly receive power from a power transmitting apparatus and configured to perform communication using a first communication method and a communication device configured to perform communication using a second communication method, to execute a control method, the control method comprising:

inquiring a user whether to enable communication functionality of the communication device, in a case where functionality of communication using the second communication method is supported by the power transmitting apparatus and in a case where the communication functionality of the communication device is in a disabled state; and enabling the communication functionality of the communication device in a case where an operation of instructing permission is performed for the inquiry; and executing authentication with the power transmitting apparatus using the second communication method after the communication functionality of the communication device has been enabled.

* * * * *